(12) United States Patent
Bolz et al.

(10) Patent No.: US 7,477,040 B2
(45) Date of Patent: Jan. 13, 2009

(54) CIRCUIT FOR A MOTOR VEHICLE ELECTRICAL DISTRIBUTION SYSTEM AND AN ASSOCIATED OPERATING METHOD

(75) Inventors: Stephan Bolz, Pfatter (DE); Rainer Knorr, Regensburg (DE); Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 584 days.

(21) Appl. No.: 10/537,684

(22) PCT Filed: Oct. 14, 2003

(86) PCT No.: PCT/DE03/03412

§ 371 (c)(1),
(2), (4) Date: Jun. 6, 2005

(87) PCT Pub. No.: WO2004/051820

PCT Pub. Date: Jun. 17, 2004

(65) Prior Publication Data

US 2006/0164033 A1    Jul. 27, 2006

(30) Foreign Application Priority Data

Dec. 4, 2002    (DE) .............................. 102 56 704

(51) Int. Cl.
*H01M 10/46* (2006.01)
(52) U.S. Cl. ..................................... 320/118
(58) Field of Classification Search ................. 320/104, 320/116, 117, 118, 119
See application file for complete search history.

(56) References Cited

U.S. PATENT DOCUMENTS 5,701,068 A    12/1997    Baer et al.

FOREIGN PATENT DOCUMENTS

| DE | 196 01 241 A1 | 7/1996 |
|---|---|---|
| EP | 0 432 639 A2 | 6/1991 |
| EP | 0 721 247 A2 | 7/1996 |
| EP | 0 828 304 A2 | 3/1998 |

OTHER PUBLICATIONS

Michel, H. et al.: "Groβ..., Maxi..., Ultra Cap Zykliebare Speicher für das 42-V-Bordnetz" [Large..., Maxi..., Ultra Cap Cyclicable Memory for the 42-V-Bord Net], Elektronik, Feb. 2002, Franzis Verlag GmbH, Munich, pp. 44-48.

*Primary Examiner*—Edward Tso
(74) *Attorney, Agent, or Firm*—Laurence A. Greenberg; Werner H. Stemer; Ralph E. Locher

(57) ABSTRACT

The invention relates to an operating method for an electrical circuit with an energy store (5), made from several storage elements (C2-C5) and a charge-equalisation circuit (6), for charge equalisation between the individual storage elements (C2-C5) of the energy store (5), comprising the following steps: charging the energy store (5) and charge equalisation between the individual storage elements (C2-C5) of the energy store (5) by means of the charge equalisation circuit (6). The invention further relates to a corresponding electrical circuit for carrying out said operating method.

16 Claims, 4 Drawing Sheets

CIRCUIT FOR A MOTOR VEHICLE ELECTRICAL DISTRIBUTION SYSTEM AND AN ASSOCIATED OPERATING METHOD

BACKGROUND OF THE INVENTION

Field of the Invention

The invention relates to an electrical circuit for a motor vehicle electrical distribution system. The electrical circuit has a first power supply, an electrical energy store formed of a plurality of storage elements which can be charged by the first power supply, and a charge-equalizing circuit for charge equalization between the individual storage elements of the energy store. The charge-equalizing circuit has a primary circuit and a plurality of secondary circuits. The primary circuit has a primary winding, while the secondary circuits each have a secondary winding and are in each case connected in parallel with the individual storage elements. The charge-equalizing circuit performs charge equalizing between the individual storage elements of the energy store.

Multi-voltage motor vehicle electrical distribution systems are known which, for example, have operating voltages of 12 volts and 42 volts and are supplied with electrical energy by an integrated starter generator (ISG).

A double-layer capacitor can, as is known, therein be used as an electrical energy store, with the energy stored in said double-layer capacitor also enabling reliable starting of the internal combustion engine after the vehicle has been temporarily idle.

For example, an engine starting system for a motor vehicle is known (DE 196 01 241 A1) in which system a double-layer capacitor is connected in parallel with a lead-acid battery. Said double-layer capacitor is charged by said lead-acid battery and discharges itself when the engine starts. The load on the lead-acid battery when the engine starts is in this way reduced.

Since, however, commercially available double-layer capacitors exhibit relatively substantial self-discharging, to enable reliable starting of the internal combustion engine the double-layer capacitor will have to be recharged from the vehicle battery at intervals of several days when the vehicle has been idle for longer periods.

The double-layer capacitor is here recharged, for example, via a dc-dc converter from the 12V vehicle battery; this, however, entails various disadvantages.

On the one hand the dc-dc converter is as a rule designed for electrical loads rated between 1 and 3 kW, so that substantial electrical losses will occur when the double-layer capacitor is recharged while the vehicle is idle.

On the other hand, as well as the double-layer capacitor it is also necessary here to charge the dc link capacitor whose function, with its large capacitance of several tens of thousands of µF, is to smooth the ripple occurring when the three-phase alternating current generated in the ISG is being rectified. The additionally required charging of the dc link capacitor likewise increases energy consumption when the vehicle is idle. This is particularly serious because, owing to its large capacitance, the dc link capacitor exhibits a high degree of self-discharging due to its physical design, and that necessitates frequent recharging.

Finally, the known type of recharging requires a switching operation, which results in further losses due in the case of electro-mechanical relays to the excitation current and in the case of power semiconductors to the control current.

SUMMARY OF THE INVENTION

The object of the invention is thus to recharge a capacitor stack—referred to below also as a double-layer capacitor—in a motor vehicle-vehicle electrical distribution system with minimal loss of energy while the vehicle is idle.

Said object is achieved, proceeding from a known circuit according to the preamble of claim 1, by means of the characterizing features of claim 1 and—in terms of a corresponding operating method—by means of the features of claim 10.

The invention includes the general technical theory of charging the double-layer capacitor by means of the charge-equalizing circuit present in any event.

The invention is not, though, restricted to the recharging of double-layer capacitors. Rather it is also conceivable to employ, instead of double-layer capacitors, other types of energy stores having a plurality of storage elements. Only the term 'double-layer capacitor' is, however, used on many occasions below for simplicity, despite its being possible to use other types of electrical energy stores instead.

Charge-equalizing circuits of the above-mentioned kind are known per se and are described in, for example, EP 0 432 639 A2, so that the content of said publication is to be included in the present description. The invention is not, however, restricted to the types of charge-equalizing circuits described therein but can also be implemented using other types of charge-equalizing circuits.

The charge-equalizing circuit is customarily connected in parallel with the double-layer capacitor, with said double-layer capacitor comprising a plurality of capacitors connected in series. The charge-equalizing circuit is therefore then powered by the double-layer capacitor itself, so that only charge equalizing between the individual capacitors of the double-layer capacitor is possible whereas charging of the double-layer capacitor as a whole is not possible.

However, in a preferred embodiment of the invention the charge-equalizing circuit optionally enables charge equalizing between the individual capacitors of the double-layer capacitor or charging of the double-layer capacitor as a whole. The charge-equalizing circuit is for this purpose connected by means of a first switching element to a first power supply and by means of a second switching element to the energy store. Either charge equalizing or charging of the double-layer capacitor will then take place depending on the switching status of said two switching elements.

When the second switching element is closed while the first switching element is open, the charge-equalizing circuit will be connected to the double-layer capacitor and split from the first power supply, with the charge-equalizing circuit being supplied with current from the first power supply. In this case the charge-equalizing circuit will only enable charge equalizing between the individual capacitors of the double-layer capacitor but no charging of the double-layer capacitor as a whole.

For charging the double-layer capacitor the second switching element is, by contrast, opened and the first switching element closed, so that the charge-equalizing circuit is electrically split from the double-layer capacitor and connected to the first power supply. In this case the charge-equalizing circuit will therefore no longer be powered by the double-layer capacitor so that recharging of the double-layer capacitor as a whole is possible. Charge equalizing between the individual capacitors of the double-layer capacitor will, however, here take place additionally.

In an advantageous variant of the invention the double-layer capacitor can optionally be charged from the first power supply or from an additional second power supply. This is advantageous in, for example, multi-voltage electrical distribution systems of motor vehicles having, for instance, a 12V battery and additionally a 36V battery for a 42V vehicle electrical distribution system. The double-layer capacitor can then be recharged by the battery having the better charging level. The charge-equalizing circuit is in this variant of the invention therefore connected by means of the first switching element to the first power supply (the 12V battery, for instance) and additionally by means of a third switching element to a second power supply (the 36V battery, for instance). In order to charge the double-layer capacitor from the first power supply, the first switching element is closed while the third switching element is open. To charge the double-layer capacitor from the second power supply the third switching element is, by contrast, closed while the first switching element is open.

The above explanations alone suffice to show that the term 'power supply' as employed within the scope of the invention is not restricted to the lead-acid batteries customary in motor vehicles but also includes other types of rechargeable batteries.

The individual switching elements are preferably driven by means of a control unit preferably connected to a timer for the purpose of checking the double-layer capacitor at regular intervals and, when necessary, recharging it.

Said control unit preferably has a first comparator unit that compares the double-layer capacitor's charge level with a first minimum value in order to recharge said double-layer capacitor if its charge level falls below the first minimum value. Said first comparator unit preferably additionally compares the energy store's charge level during recharging with a first maximum value in order to avoid excessive recharging of the double-layer capacitor.

The double-layer capacitor will preferably only be recharged if the first power supply (12V battery, for instance) or the second power supply (36V battery, for instance) has been sufficiently charged.

In a preferred embodiment a second comparator unit is therefore provided which measures the charging level of the first power supply and drives the first switching element as a function of the charging level measured. The first switching element will preferably only be switched through if the charging level of the first power supply is sufficient to enable recharging of the double-layer capacitor.

A third comparator unit is preferably additionally provided that measures the charging level of the second power supply (36V battery, for instance) and drives the third switching element as a function of the charging level measured, with the first switching element preferably only being switched through if the charging level of the second power supply is sufficient to enable recharging of the double-layer capacitor.

Relays, for instance, or semiconductor switches can be employed within the scope of the invention as switching elements. What are termed transfer gates are, however, preferably used as switching elements because the polarity of the differential voltage between the double-layer capacitor and the first power supply (12V battery, for instance) or, as the case may be, second power supply (36V battery, for instance) can be of either kind. Transfer gates of this kind are known per se and consist of two series-connected transistors preferably embodied as MOSFETs.

The invention furthermore includes a corresponding operating method for an electrical circuit of this type.

Other advantageous developments of the invention are contained in the dependent claims or will be explained below, together with the description of the preferred exemplary embodiment of the invention, with reference to the drawings, in which:

DESCRIPTION OF THE PREFERRED EMBODIMENTS

Figure 1:
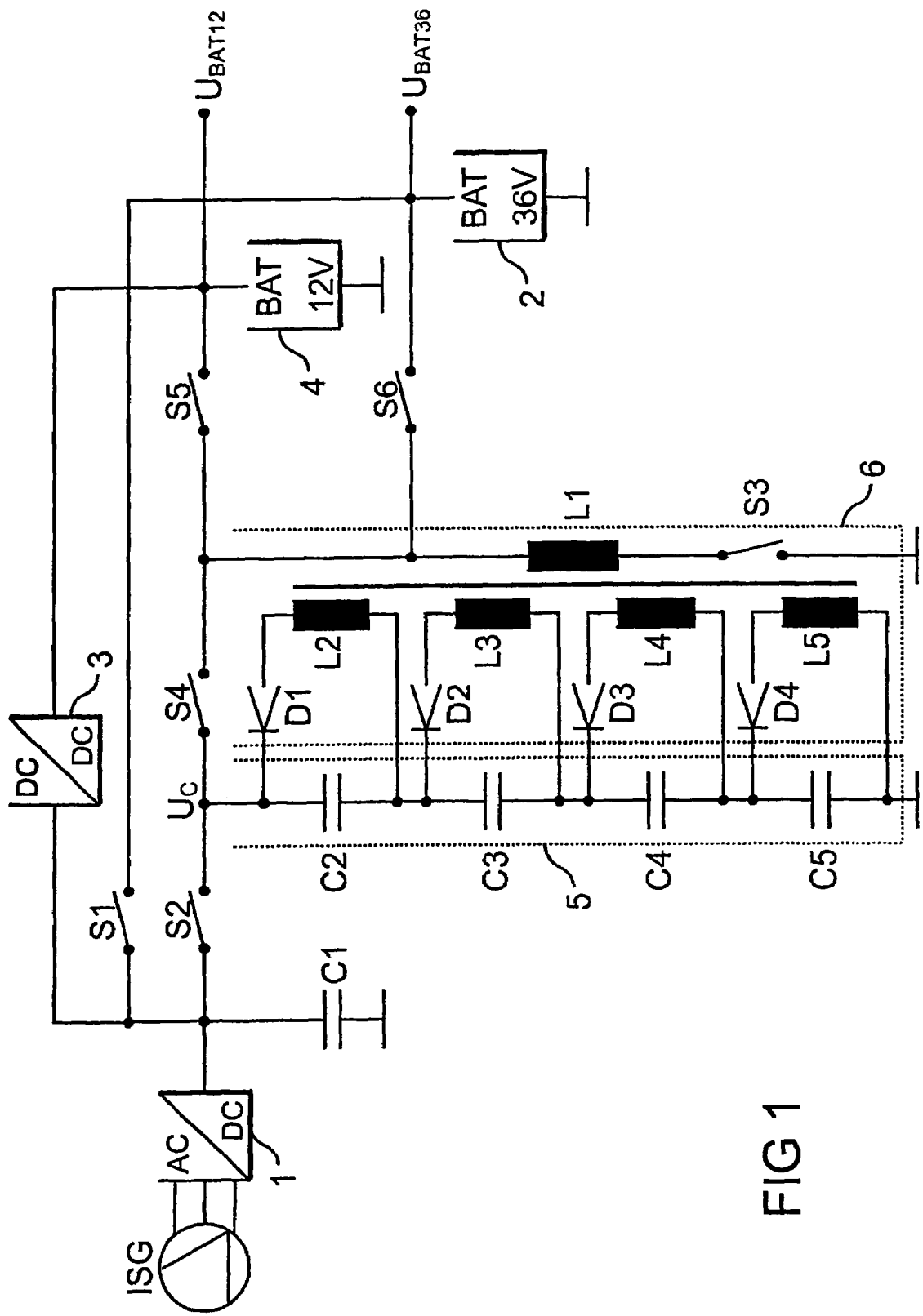
FIG. 1 shows a circuit according to the invention for a motor vehicle electrical distribution system.

FIG. 1 is a simplified diagram of a multi-voltage vehicle electrical distribution system of a vehicle having two system voltages of 12V and 42V. The physical structure of the multi-voltage vehicle electrical distribution system is first described below in order then to explain its mode of operation with the aid of FIG. 3.

The electrical energy is generated in the multi-voltage vehicle electrical distribution system by an integrated starter generator ISG driven by the crankshaft of an internal combustion engine.

The integrated starter generator ISG is connected on the output side to an electrical converter 1 that generates a dc voltage of 42V, with the output of said converter 1 being connected for the purpose of smoothing said dc voltage to ground via a dc link capacitor C1.

The output of the converter 1 is connected via a switching element S1 to a 36V battery 2 which is thus charged when the switching element S1 is closed.

The output of the converter 1 is furthermore connected via a dc-dc converter 3 to a 12V battery 4, with said dc-dc converter 3 converting the system voltage of 42V made available at the output of the converter 1 to a voltage of 14V. The 12V battery 4 is thus charged via the dc-dc converter 3 while the internal combustion engine is in operation.

The multi-voltage vehicle electrical distribution system furthermore has as an electrical energy store a double-layer capacitor 5 that can be connected via a switching element S2 to the integrated starter generator ISG and which will enable reliable starting of the internal combustion engine after the vehicle has been idle for a longer period. In this exemplary embodiment the double-layer capacitor 5 consists for the purpose of simplification of only four capacitors C2-C5 connected in series. In a 42V vehicle electrical distribution system it is, however, customary for 24 capacitors each having a maximum voltage of 2.3V to be connected in series, giving a total voltage of 55.2V. Said total voltage on the one hand enables reliable provisioning of the system voltage of 42V and, on the other hand, is below the limit of 60V up to which no special insulation measures are required for electrical systems.

The multi-voltage vehicle electrical distribution system furthermore has a conventional charge-equalizing circuit 6 that effects charge equalizing between the individual capacitors C2-C5 of the double-layer capacitor 5. The charge-equalizing circuit 6 has a primary circuit connected via a switching element S3 to ground and via a switching element S4 to the positive terminal of the double-layer capacitor 5, with a primary winding L1 being located in said primary circuit. The charge-equalizing circuit 6 furthermore has four secondary circuits each connected in parallel with the individual capacitors C2-C5. In each case one diode D1-D4 and in each case one secondary winding L2-L5 are connected in series in each secondary circuit. As the functioning of the charge-equalizing circuit 6 is described in detail in EP 0 432 639 A2, a detailed description of how said charge-equalizing circuit 6 operates can be dispensed with below.

The charge-equalizing circuit 6 can be connected via a switching element S5 to the 12V battery 4 and via a further switching element S6 to the 36V battery 2. These connections enable the double-layer capacitor 5 to be recharged via the 12V battery 4 or via the 36V battery 2, as will be described in detail.

Figure 2:
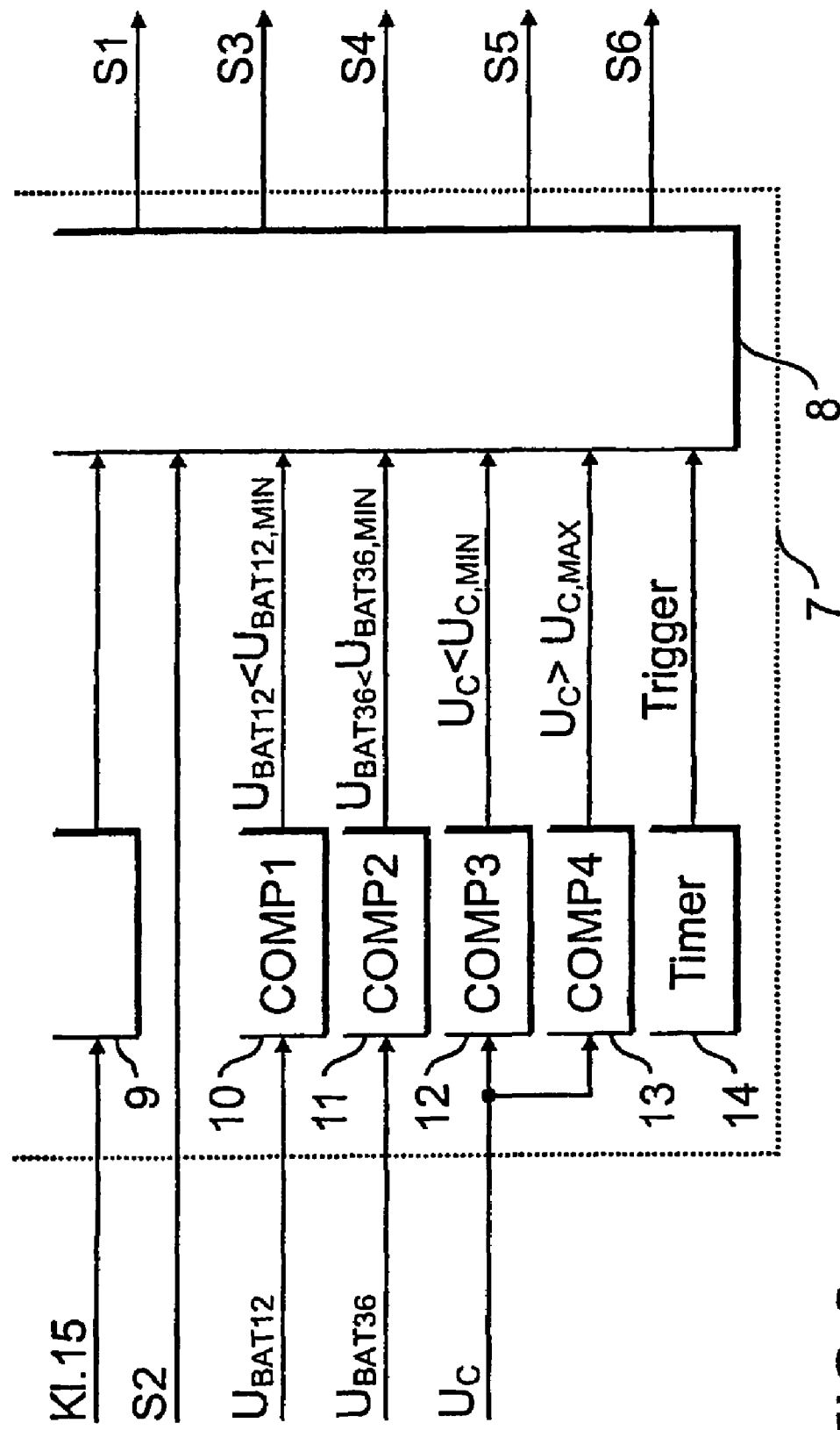
FIG. 2 shows a control unit for the circuit shown in FIG. 1.

The switching elements S3-S6 are driven by a control unit 7 shown greatly simplified in FIG. 2.

The control unit 7 has a logic unit 8 which, via a level converter 9, registers the voltage at terminal 15 of the motor vehicle electrical distribution system as well as the switch position of the switching element S2 in order to drive the switching elements S1 and S3-S6 as a function thereof, as will be described in detail.

The control unit 7 furthermore has a comparator unit 10 which measures the battery voltage $U_{BAT12}$ at the output of the 12V battery 4 and compares said voltage with a predefined minimum value $U_{BAT12,MIN}$. If said minimum value $U_{BAT12,MIN}$ has been exceeded, the comparator unit 10 will pass on a High level to the logic unit 8, with said High level indicating a sufficient charging level of the 12V battery 4.

The control unit 7 furthermore has a comparator unit 11 which measures the battery voltage $U_{BAT36}$ at the output of the 36V battery 2 and compares said voltage with a predefined minimum value $U_{BAT36,MIN}$. If said minimum value $U_{BAT36,MIN}$ has been exceeded, the comparator unit 11 will pass on a High level to the logic unit 8, with said High level indicating a sufficient charging level of the 36V battery 2.

A comparator unit 12 is furthermore provided which registers the voltage $U_C$ of the double-layer capacitor 5 and compares said voltage with a predefined minimum value $U_{C,MIN}$. If said minimum value $U_{C,MIN}$ has not been reached, the comparator unit 12 will then pass on a High level to the logic unit 8 to indicate that the double-layer capacitor 5 needs to be recharged.

The control unit 7 furthermore has a comparator unit 13 which compares the voltage $U_C$ of the double-layer capacitor 5 with a predefined maximum value $U_{C,MAX}$. If said maximum value has been exceeded, the comparator unit 13 will pass on a High level to the logic unit logic unit 8, with said High level indicating that the process of charging the double-layer capacitor 5 should be terminated.

Finally, the control unit has a timer 14 which daily issues a trigger signal to the logic unit 8 to prompt the execution of the operating method according to the invention.

The control unit 7 detects travel operation from application at terminal 15 of the system voltage of 14V. In this operating state the switches S1 or S2 as well as S4 are closed, whereas the switches S5 and S6 are open. So the charge-equalizing circuit 6 is then electrically connected via the switching element S4 to the double-layer capacitor 5 but is split from the 12V battery 4 and from the 36V battery 2. Charge equalizing between the individual capacitors C2-C5 of the double-layer capacitor 5 can then take place by way of pulsating driving of the switching element S3. Charging of the double-layer capacitor 5 as a whole will, however, not then be possible owing to the open switching elements S5 and S6, the charge-equalizing circuit 6 being split from the 12V battery 4 and from the 36V battery 2.

It must, however, be said that charge equalizing between the individual capacitors C2-C5 of the double-layer capacitor 5 should not take place when the double-layer capacitor 5 is connected to the integrated starter generator ISG and is being subjected to a high dynamic load. The control unit 7 therefore also evaluates the switching status of the switching element S2 and will block the switching element S3 of the charge-equalizing circuit 6 when the switching element S2 is closed.

The switching elements S1, S2, and S4 are, by contrast, open while the vehicle is idle so that the double-layer capacitor 5 is electrically split from the charge-equalizing circuit 6. Said splitting will enable recharging of the double-layer capacitor 5 as the charging voltage is not limited by the capacitor voltage $U_C$.

Figure 3:
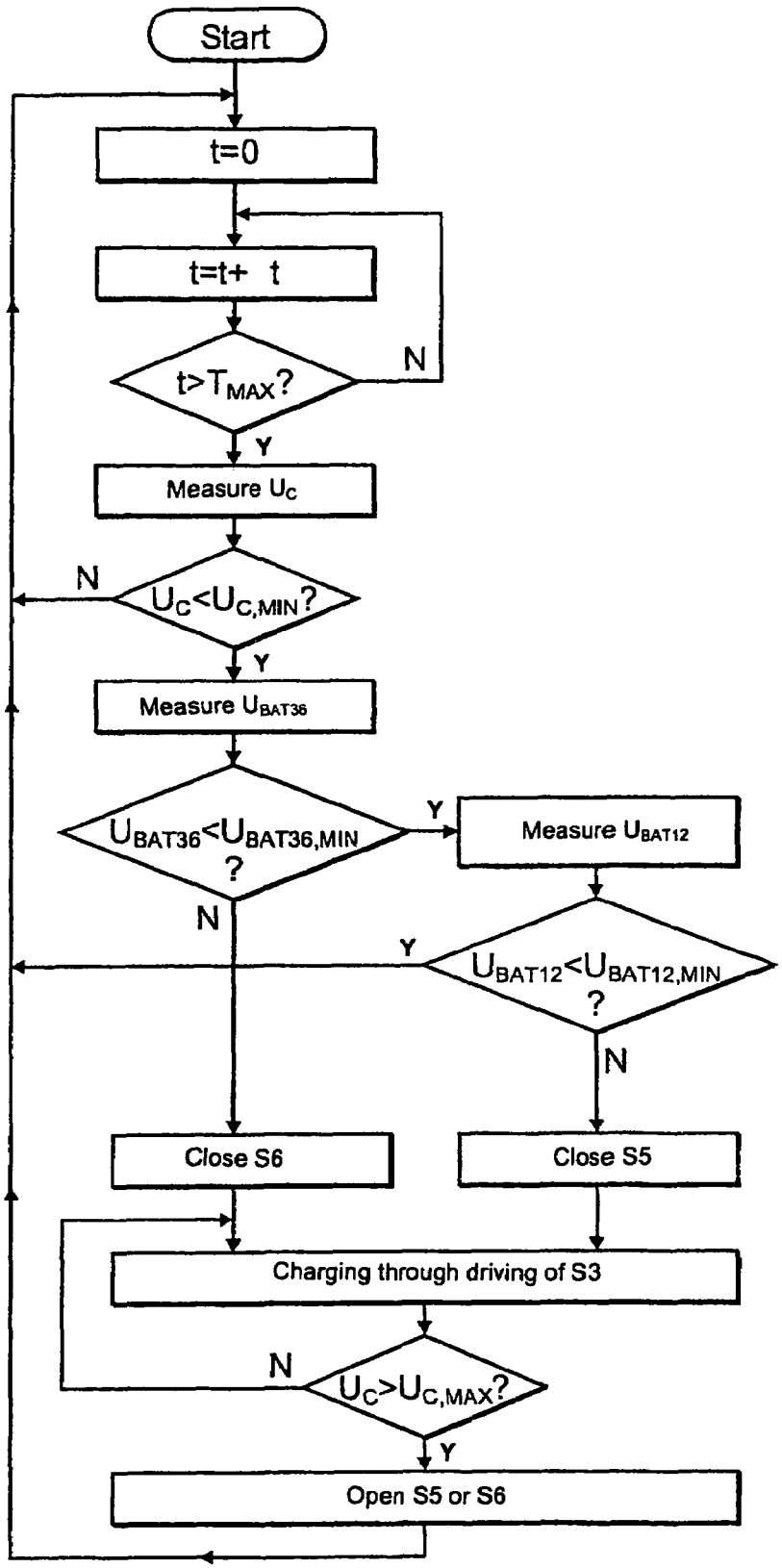
FIG. 3 shows the operating method of the circuit shown in FIG. 1.

The operating method shown in FIG. 3 will be carried out here in order to retain the charge stored in the double-layer capacitor 5 and thereby enable reliable starting of the internal combustion engine.

The timer 14 is first reset at the beginning of the operating method according to the invention, then incremented in a loop until a predefined period of time $T_{MAX}$ has elapsed, with said period of time $T_{MAX}$ corresponding to, for example, one day.

The voltage $U_C$ will then be measured at the positive terminal of the double-layer capacitor 5 to be able to check whether the double-layer capacitor 5 needs to be recharged.

The measured voltage $U_C$ is therefore compared with a minimum value $U_{C,MIN}$, with the operating method being terminated if the voltage $U_C$ exceeds said minimum value $U_{C,MIN}$, the double-layer capacitor 5 not then needing to be recharged.

If, by contrast, the voltage $U_C$ of the double-layer capacitor 5 has fallen below the minimum value $U_{C,MIN}$ owing to self-discharging of the double-layer capacitor 5, then said double-layer capacitor 5 will need to be recharged to ensure reliable restarting of the internal combustion engine.

A check is then carried out in the next steps to determine whether the charging level of the 36V battery 2 or of the 12V battery 4 will suffice to recharge the double-layer capacitor 5.

For this purpose, the voltage $U_{BAT36}$ of the 36V battery 2 is first measured and compared with a minimum value $U_{BAT36,MIN}$.

If the voltage $U_{BAT36}$ of the 36V battery 2 exceeds the predefined minimum value $U_{BAT36,MIN}$, then the energy for recharging the double-layer capacitor 5 can be taken from said 36V battery 2. In this case the switching element S6 will be closed in order to connect the charge-equalizing circuit 6 to the 36V battery 2, whereas the switching element S5 will remain open.

If, by contrast, the voltage $U_{BAT36}$ of the 36V battery 2 is below the predefined minimum value $U_{BAT36,MIN}$, then the double-layer capacitor 5 ought not to be recharged from the 36V battery 2, its charging level being insufficient for this. That will prevent the 36V battery from being damaged.

The voltage $U_{BAT12}$ of the 12V battery 4 is then measured in a next step in order to check whether the electrical energy for recharging the double-layer capacitor 5 can be taken from the 12V battery.

The measured voltage $U_{BAT12}$ of the 12V battery is therefore compared with a predefined minimum value $U_{BAT12,MIN}$.

If the voltage $U_{BAT12}$ of the 12V battery 4 is below the predefined minimum value $U_{BAT12,MIN}$, then the double-layer capacitor 5 ought not to be recharged from the 12V battery 4, its charging level being insufficient for this. In this case the double-layer capacitor 5 will not be recharged and the operating method according to the invention will be terminated.

If, by contrast, the voltage $U_{BAT12}$ of the 12V battery 4 exceeds the predefined minimum value $U_{BAT12,MIN}$, then the energy for recharging the double-layer capacitor 5 can be taken from said 12V battery 4. In this case the switching element S5 will be closed in order to connect the charge-equalizing circuit 6 to the 12V battery 4, whereas the switching element S6 will be opened.

Pulsating driving of the switching element S3 will then take place in the case both of recharging from the 12V battery 4 and recharging from the 36V battery 2 in order to charge the double-layer capacitor 5.

While the double-layer capacitor 5 is being charged, the voltage $U_C$ of the double-layer capacitor 5 will be continuously measured and compared with a maximum value $U_{C,MAX}$ to avoid excessive recharging of the double-layer capacitor 5.

The process of charging will therefore be interrupted if the voltage $U_C$ of the double-layer capacitor 5 exceeds the predefined maximum value $U_{C,MAX}$. The two switch elements S5 and S6 as well as the switching element S3 will be opened for this purpose.

The timer 14 will then be reset again and the procedural steps described above will be executed anew in a loop.

Figure 4:
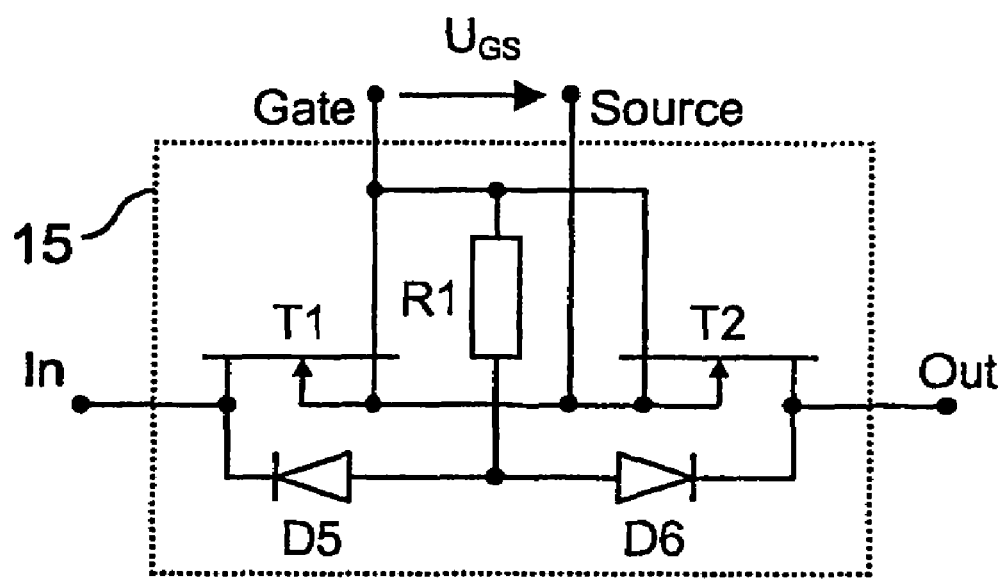
FIG. 4 shows a preferred exemplary embodiment of the switching elements in the case of the circuit shown in FIG. 1.

In conclusion, FIG. 4 shows what is termed a transfer gate 15 that can be used for implementing the switching elements S1-S6 in circuit engineering terms. The transfer gate 15 essentially consists of two series-connected MOSFET transistors T1 and T2 having two parasitic diodes D5 and D6 and of a resistor R1. Both MOSFET transistors T1 and T2 are turned on when a positive voltage of approximately $U_{GS}$=+10V is applied between the gate and source of the transfer gate 15, and said transfer gate 15 is activated. If, by contrast, the gate-source voltage $U_{GS}$ is 0V, the transfer gate 15 is deactivated. In each case only one of the two MOSFET transistors T1, T2 is turned off in the deactivated state since the respective other MOSFET transistor T1 or, as the case may be, T2 is operated with reverse polarity and its parasitic diode D5 or, as the case may be, D6 is conducting.

We claim:

1. An electrical circuit for a motor vehicle electrical distribution system, comprising:
    a first power supply;
    an electrical energy store having a plurality of storage elements and being charged by said first power supply;
    a charge-equalizing circuit for charge equalizing between said individual ones of said storage elements of said electrical energy store, said charge-equalizing circuit having a primary circuit and a plurality of secondary circuits, said primary circuit having a primary winding, said secondary circuits each having a secondary winding and are in each case connected in parallel with one of said storage elements;
    a first switching element connecting said charge-equalizing circuit to said first power supply; and
    a second switching element connecting said charge-equalizing circuit to said electrical energy store, said charge-equalizing circuit in dependence on a switching status of said first and second switching elements effecting charge equalizing and/or charging of said electrical energy store.

2. The electrical circuit according to claim 1, further comprising:
    a second power supply; and
    a third switching element connecting said charge-equalizing circuit to said second power supply for charging said electrical energy store optionally from said first power supply or from said second power supply.

3. The electrical circuit according to claim 2, further comprising a control unit for driving at least one of said first switching element, said second switching element and said third switching element.

4. The electrical circuit according to claim 3, further comprising a timer connected to said control unit for initializing recharging of said electrical energy store.

5. The electrical circuit according to claim 3, wherein said control unit has a first comparator unit for comparing a charging level of said electrical energy store with a predefined first minimum value and/or with a predefined maximum value.

6. The electrical circuit according to claim 5, wherein said control unit has a second comparator unit for comparing a voltage of said first power supply with a second minimum value and will only switch said first switching element through if the second minimum value has been exceeded.

7. The electrical circuit according to claim 6, wherein said control unit has a third comparator unit for comparing a voltage of said second power supply with a third minimum value and will only switch said third switching element through if the third minimum value has been exceeded.

8. The electrical circuit according to claim 2, wherein at least one of said first switching element, said second switching element and said third switching element is selected from the group consisting of relays and semiconductor switches.

9. The electrical circuit according to claim 2, wherein at least one of said first switching element, said second switching element and said third switching element is a transfer gate.

10. An operating method for an electrical circuit containing an electrical energy store having a plurality of storage elements and a charge-equalizing circuit for charge equalizing between individual ones of the storage elements of the electrical energy store, the charge-equalizing circuit having a primary circuit and a plurality of secondary circuits, the primary circuit of the charge-equalizing circuit having a primary winding, the secondary circuits of the charge-equalizing circuit each having a secondary winding and in each case being connected in parallel with an individual one of the storage elements, which comprises the steps of:
    charging the electrical energy store substantially exclusively through the primary and secondary windings of the charge-equalizing circuit; and
    charge equalizing between individual ones of the storage elements of the electrical energy store by the charge-equalizing circuit.

11. The operating method according to claim 10, which further comprises connecting the charge-equalizing circuit for charging the electrical energy store to a first power supply or a second power supply.

12. The operating method according to claim 11, which further comprises:
    measuring an output voltage of the first power supply;
    comparing a measured output voltage with a first minimum value; and
    connecting the charge-equalizing circuit to the first power supply only if the first minimum value has been exceeded.

13. The operating method according to claim 12, which further comprises:
    measuring an output voltage of the second power supply;
    comparing a measured output voltage of the second power supply with a second minimum value; and
    connecting the charge-equalizing circuit to the second power supply only if the second minimum value has been exceeded.

14. An operating method for an electrical circuit containing an electrical energy store having a plurality of storage elements and a charge-equalizing circuit for charge equalizing between individual ones of the storage elements of the electrical energy store, the charge-equalizing circuit having a primary circuit and a plurality of secondary circuits, the primary circuit of the charge-equalizing circuit having a primary winding, the secondary circuits of the charge-equalizing circuit each have a secondary winding and in each case connected in parallel with an individual one of the storage elements, which comprises the steps of:
- charging the electrical energy store using the charge-equalizing circuit;
- charge equalizing between individual ones of the storage elements of the electrical energy store by the charge-equalizing circuit; and
- during normal operation, connecting the electrical energy store to a first power supply and/or to a second power supply and in an idle condition disconnecting the electrical energy store from the first power supply and from the second power supply.

15. An operating method for an electrical circuit containing an electrical energy store having a plurality of storage elements and a charge-equalizing circuit for charge equalizing between individual ones of the storage elements of the electrical energy store, the charge-equalizing circuit having a primary circuit and a plurality of secondary circuits, the primary circuit of the charge-equalizing circuit having a primary winding, the secondary circuits of the charge-equalizing circuit each have a secondary winding and in each case connected in parallel with an individual one of the storage elements, which comprises the steps of:
- charging the electrical energy store using the charge-equalizing circuit;
- charge equalizing between individual ones of the storage elements of the electrical energy store by the charge-equalizing circuit;
- checking a charging level of the electrical energy store in each case after a predefined period of time has elapsed; and
- charging the electrical energy store if a predefined third minimum value has not been reached.

16. The operating method according to claim 10, which further comprises charging the electrical energy store in each case up to a predefined maximum value.

* * * * *